(12) United States Patent
Rudisill et al.

(10) Patent No.: US 11,130,876 B2
(45) Date of Patent: Sep. 28, 2021

(54) INKJET PRIMER FLUID

(71) Applicant: HEWLETT-PACKARD DEVELOPMENT COMPANY, L.P., Houston, TX (US)

(72) Inventors: Stephen G. Rudisill, San Diego, CA (US); Alexey S. Kabalnov, San Diego, CA (US); Vladek Kasperchik, Corvallis, OR (US)

(73) Assignee: Hewlett-Packard Development Company, L.P., Spring, TX (US)

( * ) Notice: Subject to any disclaimer, the term of this patent is extended or adjusted under 35 U.S.C. 154(b) by 547 days.

(21) Appl. No.: 16/080,252

(22) PCT Filed: Feb. 24, 2017

(86) PCT No.: PCT/US2017/019369
§ 371 (c)(1),
(2) Date: Aug. 27, 2018

(87) PCT Pub. No.: WO2018/156145
PCT Pub. Date: Aug. 30, 2018

(65) Prior Publication Data
US 2021/0198511 A1    Jul. 1, 2021

(51) Int. Cl.
*B29C 64/112*    (2017.01)
*B41M 5/00*    (2006.01)
(Continued)

(52) U.S. Cl.
CPC .......... *C09D 11/40* (2013.01); *B29C 64/112* (2017.08); *B41M 5/0017* (2013.01);
(Continued)

(58) Field of Classification Search
CPC . B29C 64/112; B41M 5/0017; B41M 5/0023; C09D 11/38; C09D 11/40
See application file for complete search history.

(56) References Cited

U.S. PATENT DOCUMENTS

| 5,204,055 A | 4/1993 | Sachs et al. |
| 6,921,433 B2 | 7/2005 | Kuribayashi et al. |

(Continued)

FOREIGN PATENT DOCUMENTS

| CN | 101137579 | 3/2008 |
| CN | 100584901 | 1/2010 |

(Continued)

OTHER PUBLICATIONS

Faraday, Michael. "X. The Bakerian Lecture,—Experimental relations of gold (and other metals) to light," Philosophical Transactions of the Royal Society of London 147 (1857): 145-181.

(Continued)

*Primary Examiner* — Lamson D Nguyen
(74) *Attorney, Agent, or Firm* — Dierker & Kavanaugh PC

(57) ABSTRACT

An example inkjet primer fluid includes an alkoxysilane, a surfactant, a co-solvent, and a balance of water; and is at least substantially colorless. In an example method, a primer fluid, including an alkoxysilane, a surfactant, a co-solvent, and a balance of water, is thermal inkjet printed from a thermal inkjet printhead to form a silicon dioxide film on a resistor. Then, a jettable composition, including suspended nanoparticles, is thermal inkjet printed from the thermal inkjet printhead. In another example method, suspended nanoparticles, an alkoxysilane, and a growth mediator are combined to form a mixture. The mixture is heated to a temperature ranging from about 60° C. to about 80° C. and stirred for about 12 hours to about 36 hours to form silicon dioxide coated, suspended nanoparticles. Then, a surfactant, a zwitterionic stabilizer, a co-solvent, and a balance of water are added to the mixture to form a stabilized, jettable composition.

12 Claims, 3 Drawing Sheets

(51) Int. Cl.
*C09D 11/40* (2014.01)
*C09D 11/38* (2014.01)
*B29K 83/00* (2006.01)

(52) U.S. Cl.
CPC ......... *B41M 5/0023* (2013.01); *C09D 11/38* (2013.01); *B29K 2083/00* (2013.01)

(56) References Cited

U.S. PATENT DOCUMENTS

| | | | |
|---|---|---|---|
| 7,275,308 | B2 | 10/2007 | Kim et al. |
| 7,972,426 | B2 | 7/2011 | Hinch et al. |
| 8,119,233 | B2 | 2/2012 | Chiruvolu et al. |
| 8,123,344 | B2 | 2/2012 | Goredema et al. |
| 8,141,986 | B2 | 3/2012 | Chung et al. |
| 8,651,390 | B2 | 2/2014 | Hinch et al. |
| 9,643,359 | B2 | 5/2017 | Baumann et al. |
| 2007/0238056 | A1 | 10/2007 | Baumann et al. |
| 2015/0116417 | A1 | 4/2015 | Chopra et al. |

FOREIGN PATENT DOCUMENTS

| | | |
|---|---|---|
| CN | 102127338 | 7/2011 |
| CN | 102532983 A | 7/2012 |
| CN | 102583404 | 7/2012 |
| CN | 104136555 | 11/2014 |
| WO | 2001032789 A1 | 5/2001 |
| WO | WO-2007114895 A2 | 10/2007 |
| WO | 2013162513 A1 | 10/2013 |
| WO | 2014206494 A1 | 12/2014 |
| WO | 2016003407 A1 | 1/2016 |
| WO | WO-2016093840 | 6/2016 |
| WO | 2016144677 A1 | 9/2016 |
| WO | WO-2017018984 A1 | 2/2017 |

OTHER PUBLICATIONS

Garcia, Guillermo, et al. "Dynamically modulating the surface plasmon resonance of doped semiconductor nanocrystals." Nano letters 11.10 (2011): 4415-4420.

Gross, Bethany C., et al. "Evaluation of 3D printing and its potential impact on biotechnology and the chemical sciences." (2014): 3240-3253.

Kanehara, Masayuki, et al. "Indium tin oxide nanopartioles with compositionally tunable surface plasmon . . . " Jrnl of the Amer Chem Society 131.49, 200,: 17736-17737.

Milligan, W. O., and R. H. Morriss. "Morphology of Colloidal Gold—A Comparative Study." Journal of the American Chemical Society 86.17 (1964): 3461-3467.

Usui, Hiroyuki, Takeshi Sasaki, and Naoto Koshizaki. "Optical transmittance of indium tin oxide nanoparticles prepared by laser-induced fragmentation in water," The Journal of Physical Chemistry B 110.26 (2006): 12890-12895.

Van der Zande, Bianca Mi, et al. "Aqueous gold sols of rod-shaped particles." The Journal of Physical Chemistry B 101.6 (1997): 852-854.

Weiser, H., et al., "Von Weimark's Precipitation Theory and the Formation of Colloidal Gold", 10 pages, The Rice Institute, Houston, TX.

INKJET PRIMER FLUID

BACKGROUND

In addition to home and office usage, inkjet technology has been expanded to high-speed, commercial and industrial printing, as well as to three-dimensional (3D) printing. Inkjet printing is a non-impact printing method that utilizes electronic signals to control and direct droplets or a stream of ink to be deposited on media, or to control and direct droplets or a stream of one or more agents (e.g., fusing agents, detailing agents, etc.) to be deposited on a build material. Current inkjet printing technology involves forcing the ink drops through small nozzles by thermal ejection, piezoelectric pressure or oscillation onto the surface of the media. This technology has become a popular way of recording images on various media surfaces (e.g., paper), for a number of reasons, including, for example, low printer noise, capability of high-speed recording and multi-color recording. This technology is also becoming increasingly more popular in 3D printing for a number of reasons, including, for example, rapid and precise deposition of the one or more agents.

BRIEF DESCRIPTION OF THE DRAWINGS

Features of examples of the present disclosure will become apparent by reference to the following detailed description and drawings, in which like reference numerals correspond to similar, though perhaps not identical, components.

DETAILED DESCRIPTION

Thermal inkjet printheads may be prone to kogation. Kogation refers to the deposition of dried jettable composition components, or their oxidation products, on a heating element or resistor of the thermal inkjet printhead. The buildup of kogation can affect the ability of the resistor to generate droplets of uniform weight and velocity over its lifetime. As such, kogation can deleteriously affect the printhead performance (e.g., drop placement, color consistency, etc.), and can even lead to printhead failure.

Some jettable compositions include suspended nanoparticles, such as ceramic nanoparticles or metal nanoparticles. It has been found that when these nanoparticle-containing jettable compositions are printed from thermal inkjet printheads, the nanoparticles can sinter together when they are exposed to the heat of the firing resistor. The sintered nanoparticles can form thermally-insulating layers on the surface of the resistor, which can increase kogation and its deleterious effects. These thick, thermally-insulating layers on the resistor surface can, for example, cause a 33% decrease in drop weight and drop velocity within 50 million drops per nozzle (MDPN).

Figure 1:
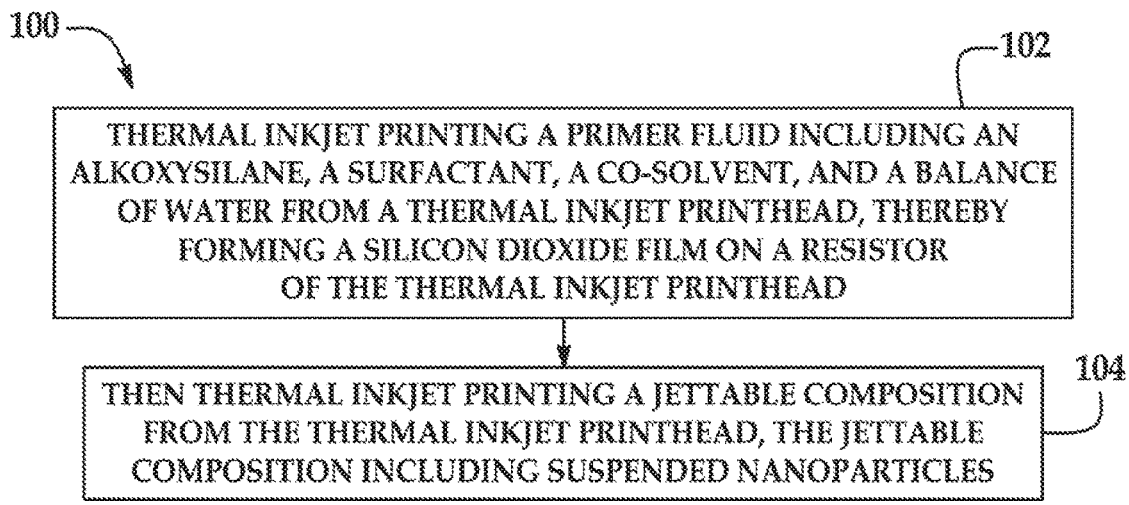
FIG. 1 is a flow diagram illustrating an example of a method disclosed herein.

Examples of a method disclosed herein utilize an inkjet primer fluid, which includes an alkoxysilane, to reduce kogation during thermal inkjet printing (see FIG. 1). When the inkjet primer fluid is thermal inkjet printed from a thermal inkjet printhead, the heat of the resistor may activate a reaction between the alkoxysilane and the resistor surface. The reaction may result in the formation of a silicon dioxide ($SiO_2$) film on the resistor surface. This silicon dioxide film may reduce kogation on the resistor and/or mitigate the deleterious effect on drop weight and drop velocity, for example, when a jettable composition, which includes suspended nanoparticles, is thermal inkjet printed from the printhead.

Figure 2:
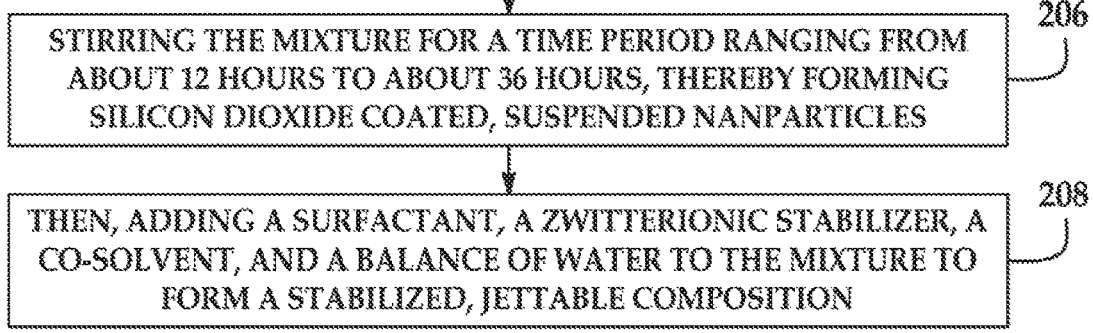
FIG. 2 is a flow diagram illustrating another example of a method disclosed herein.

Examples of another method disclosed herein utilize the alkoxysilane to introduce a silicon dioxide ($SiO_2$) coating onto nanoparticles that are suitable for use in jettable compositions (see FIG. 2). The introduction of the silicon dioxide onto the nanoparticle surface may improve the physical stability of the jettable composition including the silicon dioxide coated nanoparticles (as compared to a similar jettable composition that has the same components in the same amounts but includes uncoated, suspended nanoparticles instead of the silicon dioxide coated, suspended nanoparticles). The introduction of the silicon dioxide onto the nanoparticle surface may also render the nanoparticles less reactive with the resistor surface, and thus may reduce kogation on the resistor and/or may mitigate the deleterious effect on drop weight and drop velocity for example, when a jettable composition, which includes the silicon dioxide coated nanoparticles, is thermal inkjet printed from the printhead. This example method includes heating and stirring a mixture, which includes suspended nanoparticles, the alkoxysilane, and a growth mediator, to form the silicon dioxide coating on the suspended nanoparticles.

As used herein, the terms "silicon dioxide film" and "silicon dioxide coating" refer to a film or coating in which the silicon atom shows tetrahedral coordination, with four oxygen atoms surrounding the central silicon atom. Depending upon the thickness of the film or coating, oxygen atom(s) may be present between two silicon atoms. In some instances, two of the oxygen atoms of the tetrahedron are bonded to atom(s) at the resistor surface, and in other instances, two of the oxygen atoms of the tetrahedron are bonded to atom(s) at the surface of the nanoparticle. It is to be understood that the oxygen atom(s) at the surface of the silicon dioxide film or the silicon dioxide coating may be attached to a hydrogen atom. As such, the silicon dioxide film or the silicon dioxide coating may have hydroxyl (—OH) groups at the outermost surface, which can be deprotonated to yield a negatively-charged surface.

The term "physical stability," as referred to herein, means the ability of the nanoparticles in the jettable composition to remain substantially unchanged over time. To determine the physical stability of a composition, the change in particle size may be measured over time (e.g., using dynamic light scattering), and the percentage of size change may be determined. The particle size may be considered to be "substantially unchanged over time" when the particle size does not increase above 20 nm (from its original size). However, in some instances, larger particle size increases may still be considered physically stable, as long as the particles do not settle. One method for determining the physical stability is to measure the particle size, in terms of volume-weighted distribution, of the nanoparticles. Such a distribution represents the population of particles, seen by their volume. As an example, the volume-weighted mean diameter may be measured with a NANOTRAC® particle sizing system (which may use a 50% cumulative value of a volume-weighted mean diameter), commercially available from Microtrac, Inc. The particle sizing system uses dynamic scattering of laser light.

To facilitate the measurement of the particle size change, the jettable composition may be stored in an accelerated storage (AS) environment. The particle size may be measured before and after the jettable composition has been stored in the AS environment. The accelerated storage environment may be an environment that has a temperature ranging from about 45° C. to about 60° C. In an example, the accelerated storage environment is an oven baked at a temperature of about 60° C. and the jettable composition is stored in the AS environment for about four weeks.

The example method 100 shown in FIG. 1 includes treating a thermal inkjet printhead with an example of a primer fluid disclosed herein, and then using the treated thermal inkjet printhead to print a jettable composition, which includes suspended nanoparticles. More particularly, the method 100 shown in FIG. 1 includes thermal inkjet printing the primer fluid including an alkoxysilane, a surfactant, a co-solvent, and a balance of water from the thermal inkjet printhead, thereby forming a silicon dioxide film on a resistor of the thermal inkjet printhead (as shown at reference numeral 102); and then thermal inkjet printing a jettable composition from the thermal inkjet printhead, the jettable composition including suspended nanoparticles (as shown at reference numeral 104).

The primer fluid (also referred to herein as the inkjet primer fluid) generally includes an inkjet primer fluid (IPF) vehicle and the alkoxysilane. In an example, the IPF vehicle includes a surfactant, a co-solvent, and a balance of water. As such, in an example, the inkjet primer fluid comprises an alkoxysilane, a surfactant, a co-solvent, and a balance of water, wherein the inkjet primer fluid is at least substantially colorless. In another example, the inkjet primer fluid consists of the alkoxysilane and the IPF vehicle, with no other components.

The alkoxysilane in the inkjet primer fluid contributes to the formation of the silicon dioxide ($SiO_2$) film on the surface of the resistor(s) of the thermal inkjet printhead that is exposed to the inkjet primer fluid. The heat generated during printing of the inkjet primer fluid can activate a series of reactions involving the alkoxysilane, namely hydrolysis followed by condensation on the resistor surface. As such, any alkoxysilane that can undergo these reactions may be used. In some examples, the alkoxysilane is selected from the group consisting of tetraethyl orthosilicate (TEOS), tetramethyl orthosilicate (TMOS), tetraisopropyl orthosilicate, tetrabutyl orthoslilicate, 3-aminopropyl triethoxysilane, and combinations thereof. In other examples, the alkoxysilane may be selected for its stability in the (IPF) vehicle, and thus the inkjet primer fluid. Larger alkyl groups in the alkoxysilane structure allow the alkoxysilane to hydrolyze at a slower rate, and thus be more stable, in the (IPF) vehicle, which prolongs the shelf life of the inkjet primer fluid. For example, tetrabutyl orthosilicate will hydrolyze slower and be more stable than tetrapropyl orthosilicate, and tetrapropyl orthosilicate will hydrolyze slower and be more stable than tetraethyl orthosilicate. Examples of the alkoxysilane that may be selected for their stability in the inkjet primer fluid include quaternary alkoxysilanes, such as tetraethyl orthosilicate (TEOS), tetramethyl orthosilicate (TMOS), tetraisopropyl orthosilicate, tetrabutyl orthoslilicate, etc. Other examples of the alkoxysilane may include polar, substituted trialkoxysilanes, such as 3-aminopropyl triethoxysilane (APTES). These alkoxysilanes may react relatively quickly (e.g., hydrolysis and condensation may be initiated in the fluid, for example, if water, an acid, or a base is present), and thus the shelf life of the inkjet primer fluid including these alkoxysilanes may be shorter than the shelf life of the fluid when other, more stable alkoxysilanes are included.

The amount of the alkoxysilane in the inkjet primer fluid may range from about 0.1 wt % to about 2 wt % based on the total wt % of the inkjet primer fluid. In an example, the amount of the alkoxysilane present in the inkjet primer fluid is about 1 wt % based on the total wt % of the inkjet primer fluid. It is believed that these alkoxysilane loadings provide a balance between the inkjet primer fluid having jetting reliability and silicon dioxide film-forming efficiency.

As used herein, "IPF vehicle" may refer to the liquid fluid in which the alkoxysilane is placed to form the inkjet primer fluid. A wide variety of IPF vehicles may be used with the inkjet primer fluid and method 100 of the present disclosure. The IPF vehicle may include water in combination with a mixture of a variety of additional components. Examples of these additional components may include co-solvent(s), surfactant(s), stability alcohol(s), anti-kogation agent(s), chelating agent(s), and/or antimicrobial agent(s).

In some examples, the IPF vehicle includes a surfactant, a co-solvent, and a balance of water. In other examples, the IPF vehicle consists of these components, with no other components. In still other examples, the IPF vehicle includes a stabilizing alcohol. In still other examples, the IPF vehicle consists of the surfactant, the co-solvent, the stabilizing alcohol, and a balance of water, with no other components. In yet further examples, the IPF vehicle may include additional components, such as an additive (e.g., an anti-kogation agent, a chelating agent, an antimicrobial agent, or combinations thereof).

The IPF vehicle of the inkjet primer fluid may include surfactant(s). Examples of suitable surfactants are non-ionic surfactants. Some specific examples include a self-emulsifiable, nonionic wetting agent based on acetylenic diol chemistry (e.g., SURFYNOL® SEF from Air Products and Chemicals, Inc.), a nonionic fluorosurfactant (e.g., CAPSTONE® fluorosurfactants from DuPont, previously known as ZONYL FSO), and combinations thereof. In other examples, the surfactant is an ethoxylated low-foam wetting agent (e.g., SURFYNOL® 440 or SURFYNOL® CT-111 from Air Products and Chemical Inc.) or an ethoxylated wetting agent and molecular defoamer (e.g., SURFYNOL® 420 from Air Products and Chemical Inc.). Still other suitable surfactants include non-ionic wetting agents and molecular defoamers (e.g., SURFYNOL® 104E from Air Products and Chemical Inc.), or water-soluble, non-ionic surfactants (e.g., TERGITOL™ TMN-6, TERGITOL™ 15S7, and TERGITOL™ 15S9 from The Dow Chemical Company or TEGO®WET 510 from Evonik Industries). In some examples, an anionic surfactant may be used in combination with the non-ionic surfactant. One suitable anionic surfactant is an alkyldiphenyloxide disulfonate (e.g., DOWFAX™ 8390 and DOWFAX™ 2A1 from The Dow Chemical Company). In some examples, it may be desirable to utilize a surfactant having a hydrophilic-lipophilic balance (HLB) less than 10.

The surfactant(s) may be present in the inkjet primer fluid in an amount ranging from about 0.01 wt % to about 2 wt % of the total wt % of the inkjet primer fluid. In an example, the amount of the surfactant(s) present in the inkjet primer fluid is about 0.75 wt % (based on the total wt % of the inkjet primer fluid).

The IPF vehicle may include co-solvent(s). Some examples of the co-solvent that may be added to the IPF vehicle include ethanol, 1-(2-hydroxyethyl)-2-pyrollidinone, 2-pyrrolidinone, 2-methyl-1,3-propanediol, 1,5-pentanediol, triethylene glycol, tetraethylene glycol, 1,6-hexanediol, tripropylene glycol methyl ether, ethoxylated glycerol-1 (LEG-1), and combinations thereof.

Whether a single co-solvent is used or a combination of co-solvents is used, the total amount of co-solvent(s) in the inkjet primer fluid may range from about 15 wt % to about 98 wt % with respect to the total wt % of the inkjet primer fluid. As such, while the term co-solvent is used (i.e., because it is present in the fluid with water), it is to be understood that the co-solvent may actually be the primary solvent and water may be the secondary solvent in the primer fluid, depending upon the respective amounts that are present. For example, when a less stable alkoxysilane is used, it may be desirable to use less water and more co-solvent in order to increase the shelf life of the primer fluid. In an example, the amount of the co-solvent(s) present in the inkjet primer fluid is at least 50 wt % (based on the total wt % of the inkjet primer fluid). In this example, the large amount of the co-solvent may contribute to the stability of the alkoxysilane. In other examples (e.g., when a more stable alkoxysilane having a slower hydrolysis rate is used), the co-solvent amount may make up less than 50 wt % of the primer fluid. For example, the amount of the co-solvent(s) present in the inkjet primer fluid may be about 27 wt % (based on the total wt % of the inkjet primer fluid).

The IPF vehicle of the inkjet primer fluid may also include a stabilizing alcohol. During silicon dioxide film formation, the hydrolysis of the alkoxysilane may produce an alcohol as a reaction product. This alcohol product may suppress the hydrolysis rate of the remaining alkoxysilane. In order to suppress the premature hydrolysis of the alkoxysilane in the primer fluid (i.e., prior to resister heat exposure) and thus improve the stability of the primer fluid, this same type of alcohol can be added directly to the primer fluid. As such, any alcohol that can be formed as a product of the alkoxysilane hydrolysis reaction(s) may be utilized as the stabilizing alcohol in the primer fluid.

Examples of suitable stabilizing alcohols include methanol, ethanol, isopropanol, 1-propanol, and/or 1-butanol. The specific stabilizing alcohol that can be used in a specific IPF vehicle will depend, in part, on the alkoxysilane used. For example, when tetraethyl orthosilicate (TEOS) is used as the alkoxysilane, ethanol may be used as the stabilizing alcohol. As another example, when tetramethyl orthosilicate (TMOS) is used as the alkoxysilane, methanol may be used as the stabilizing alcohol.

The stabilizing alcohol may be present in an amount ranging from about 1 wt % to about 70 wt % based on the total wt % of the inkjet primer fluid. In an example, the stabilizing alcohol may be present in an amount ranging from about 1 wt % to about 10 wt % when the primer fluid is water-based (i.e., the balance of water is 50 wt % or higher). In another example, the stabilizing alcohol (e.g., methanol or ethanol) may be present in an amount ranging from about 50 wt % to about 70 wt % when the primer fluid is alcohol-based (i.e., the balance of water is lower than 50 wt %).

In some examples, the IPF vehicle may also include one or more of the previously mentioned other additives. To reiterate, the additive may be an anti-kogation agent, a chelating agent, an antimicrobial agent, or a combination thereof. While the amount of the additive may vary depending upon the type of additive, generally an individual additive may be present in the inkjet primer fluid in an amount ranging from about 0.1 wt % to about 2 wt % (based on the total wt % of the inkjet primer fluid).

As mentioned above, an anti-kogation agent may be included in the inkjet primer fluid. Also as mentioned above, kogation refers to the deposit of dried jettable composition components (or dried inkjet primer fluid components) on a heating element or resistor of a thermal inkjet printhead. Anti-kogation agent(s) is/are included to assist in preventing the buildup of kogation. Examples of suitable anti-kogation agents include oleth-3-phosphate (e.g., commercially available as CRODAFOS™ O3A or CRODAFOS™ N-3 acid from Croda), or a combination of oleth-3-phosphate and a low molecular weight (e.g., <5,000) polyacrylic acid polymer.

Whether a single anti-kogation agent is used or a combination of anti-kogation agents is used, the total amount of anti-kogation agent(s) in the inkjet primer fluid, when included, may range from about 0.1 wt % to about 2 wt % (based on the total wt % of the inkjet primer fluid). In an example, the anti-kogation agent(s) present in the inkjet primer fluid is about 0.75 wt % (based on the total wt % of the inkjet primer fluid).

The IPF vehicle may also include a chelating agent. The chelating agent may be included in the inkjet primer fluid to eliminate the deleterious effects of heavy metal impurities. Examples of suitable chelating agents include disodium ethylenediaminetetraacetic acid (EDTA-Na), ethylene diamine tetra acetic acid (EDTA), and methylglycinediacetic acid (e.g., TRILON® M from BASF Corp.).

Whether a single chelating agent is used or a combination of chelating agents is used, the total amount of chelating agent(s) in the inkjet primer fluid may range from 0 wt % to about 2 wt % based on the total wt % of the inkjet primer fluid. In an example, the chelating agent is present in the inkjet primer fluid in an amount of about 0.45 wt % (based on the total wt % of the inkjet primer fluid).

The IPF vehicle may also include antimicrobial agent(s). Suitable antimicrobial agents include biocides and fungicides. Example antimicrobial agents may include the NUOSEPT® (Ashland Inc.), VANCIDE® (R.T. Vanderbilt Co.), ACTICIDE® B20 and ACTICIDE® M20 (Thor Chemicals), and combinations thereof.

In an example, the inkjet primer fluid may include a total amount of antimicrobial agents that ranges from about 0.1 wt % to about 1 wt % (based on the total wt % of the inkjet primer fluid). In another example, the antimicrobial agent is present in the inkjet primer fluid in an amount of about 0.25 wt % (based on the total wt % of the inkjet primer fluid).

The balance of the inkjet primer fluid is water. As an example, deionized water may be used. The amount of water may affect the stability and shelf life of the primer fluid depending upon the type of alkoxysilane that is present. As such, in some examples, the balance of water may be as low as about 1 wt %, and in other examples, the balance of water may be as high as about 85 wt %. Any amount of water within this range may also be used, depending upon the amounts of the alkoxysilane, the surfactant(s), the co-solvent(s), and the additive(s).

In an example, the inkjet primer fluid comprises the alkoxysilane, the surfactant, the co-solvent, the stabilizing alcohol, the additive(s), and a balance of water, wherein the inkjet primer fluid is at least substantially colorless. In this example of the inkjet primer fluid, any of: the alkoxysilane is present in an amount ranging from about 0.1 wt % to about 2 wt % based on a total wt % of the inkjet primer fluid; the surfactant is present in an amount ranging from about 0.01 wt % to about 2 wt % based on the total wt % of the inkjet primer fluid; the co-solvent is present in an amount ranging from about 15 wt % to about 98 wt % based on the total wt % of the inkjet primer fluid; the stabilizing alcohol is present in an amount ranging from about 1 wt % to about 70 wt % based on the total wt % of the inkjet primer fluid; the additive is selected from the group consisting of an anti-kogation agent, a chelating agent, an antimicrobial agent, and a combination thereof, and is present in an amount ranging from about 0.1 wt % to about 2 wt % based on the total wt % of the inkjet primer fluid.

The inkjet primer fluid disclosed herein is at least substantially colorless. By "at least substantially colorless," it is meant that the primer fluid may be colorless or substantially colorless. In some examples, the inkjet primer fluid is colorless. In these examples, the inkjet primer fluid excludes a colorant and a dispersant. In some other examples, the inkjet primer fluid is substantially colorless. As used herein, the term "substantially colorless" means that a colorant is present in the primer fluid an amount that is sufficient to provide a visible hue to the primer fluid and that is insufficient to generate a colored image or to provide color to a powder build material. In these examples, at most, the inkjet primer fluid has one tenth ($\frac{1}{10}^{th}$) of the quantity of colorant used in a typical colored ink (which may be as low as 0.1 wt % for pigment and 0.01 wt % for dye). In an example, the inkjet primer fluid may have from about one fiftieth ($\frac{1}{50}^{th}$) of the typical inkjet ink colorant amount to about one tenth ($\frac{1}{10}^{th}$) of the of the typical inkjet ink colorant amount (e.g., from about 0.002 wt % to about 0.01 wt % for a pigment and from about 0.0002 wt % to about 0.001 wt % for a dye). In these examples, the inkjet primer fluid may include a colorant to tint the inkjet primer fluid. The inkjet primer fluid may be tinted for the convenience of the user so that he or she may be able to see that the inkjet primer fluid printed. The lightness of the tint of the inkjet primer fluid is linear with mass concentration, so the tint of the inkjet primer fluid may be from about one fiftieth ($\frac{1}{50}^{th}$) to about one tenth ($\frac{1}{10}^{th}$) as light as a colored ink.

When a small amount (e.g., from about 0.002 wt % to about 0.01 wt % for a pigment and from about 0.0002 wt % to about 0.001 wt % for a dye) of colorant is included in the inkjet primer fluid, the colorant may be a pigment and/or dye having any suitable color. Examples of the colors include cyan, magenta, yellow, etc. Examples of colorants include dyes, such as Acid Yellow 23 (AY 23), Acid Yellow 17 (AY 17), Acid Red 52 (AR 52), Acid Red 289 (AR 289), Reactive Red 180 (RR 180), Direct Blue 199 (DB 199), or pigments, such as Pigment Blue 15:3 (PB 15:3), Pigment Red 122 (PR 122), Pigment Yellow 155 (PY 155), and Pigment Yellow 74 (PY 74). In one example, the colorant is included in the primer fluid without a dispersant. For example, the inkjet primer fluid disclosed herein includes the pigment in an amount ranging from about 0.002 wt % to about 0.01 wt % based a total wt % of the inkjet primer fluid, and excludes a dispersant.

While not shown in FIG. 1, some examples of the method 100 further include preparing the primer fluid. In these examples, the primer fluid may be prepared by adding the alkoxysilane to a vehicle (i.e., the IPF vehicle) including the surfactant, the co-solvent, and water. The alkoxysilane may be the last component added to the vehicle to decrease the amount of time that the alkoxysilane has to react with the water and condense into silicon dioxide before being exposed to the resistor.

The previously described primer fluid may be used in the method 100. This method may be used for reducing kogation during thermal inkjet printing. In an example, kogation during thermal inkjet printing can be measured by a percent decrease in drop weight within a predetermined number of drops per nozzle, a percent decrease in drop velocity within a predetermined number of drops per nozzle, or a combination thereof.

As shown at reference numeral 102 in FIG. 1, the method 100 includes thermal inkjet printing the primer fluid from the thermal inkjet printhead to form a silicon dioxide ($SiO_2$) film on the resistor of the thermal inkjet printhead. The primer fluid may be thermal inkjet printed onto media or into a container (e.g., a waste container).

The amount or volume of the primer fluid that is thermal inkjet printed may depend on the size of the resistor and/or the desired thickness of the silicon dioxide film. In an example, the amount of primer fluid that is thermal inkjet printed ranges from about 10 mL to about 25 mL. It is to be understood that this amount may vary for different printheads. For example, printheads that store relatively large volumes of fluid (e.g., from about 100 mL to about 150 mL) may dispense from about 10 mL to about 150 mL of the primer fluid.

In the examples disclosed herein, it is desirable that the primer fluid be printed from the thermal inkjet printhead within the shelf life of the primer fluid, so that the alkoxysilane does not begin to react in the primer fluid prior to coming into contact with the resistor.

As mentioned above, when the primer fluid is printed from the thermal inkjet printhead, the heat of the resistor may activate a reaction between the alkoxysilane in the primer fluid and the resistor surface. The alkoxysilane may undergo a hydrolysis reaction followed by a condensation reaction causing the deposition of the silicon dioxide film on the surface of the resistor.

In one example, the alkoxysilane may be tetraethyl orthosilicate (TEOS) and may undergo the following hydrolysis reaction (I):

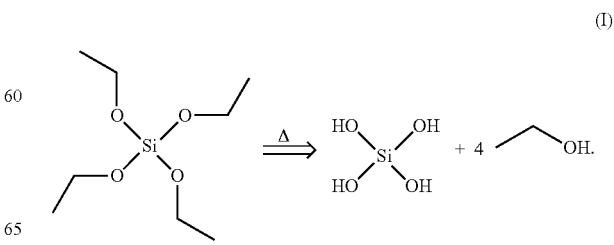

Then the hydrolyzed alkoxysilane may undergo the following condensation reaction (I) on the resistor, which in this example is tantalum oxide (TaO):

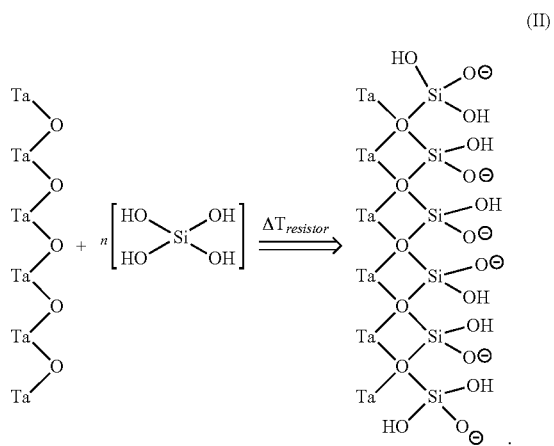

The silicon dioxide film formed on the resistor may be porous. In an example, the pores of the silicon dioxide film may have a pore size ranging from about 50 nm to about 1000 nm.

The silicon dioxide film formed on the resistor may have any thickness. In an example, the silicon dioxide film may have a uniform thickness or a non-uniform thickness (i.e., the thickness varies across the surface of the resistor). The thickness of the silicon dioxide film may range from about 5 nm to about 500 nm. In the example where the non-uniform thickness is within this range, the thickness throughout the plane of the silicon dioxide film may vary but may always be between about 5 nm and about 500 nm.

In an example, the silicon dioxide film has pores with a pore size ranging from about 50 nm to about 1000 nm, and also has a non-uniform thickness.

In some examples, the silicon dioxide film is negatively charged. The silicon dioxide film may be negatively charged when the film is in the presence of a basic fluid (i.e., a fluid having a pH above 7), such as the non-reacted components of the primer fluid or a jettable composition that is subsequently dispensed from the treated thermal inkjet printhead. In another example, the silicon dioxide film does not have a charge (i.e., is neutral). The silicon dioxide film may be neutral when the film is in the presence of a neutral fluid (i.e., a fluid having a pH of 7), such as the non-reacted components of the primer fluid or a jettable composition that is subsequently dispensed from the treated thermal inkjet printhead.

After the silicon dioxide film has been formed by the reactions initiated during thermal inkjet printing of the primer fluid from the thermal inkjet printhead, a jettable composition is thermal inkjet printed from the same thermal inkjet printhead, as shown at reference numeral 104 of FIG. 1. The jettable composition may be printed immediately after the primer fluid is printed (and purged from the printhead), or a period of time may pass after the primer fluid is printed and before the jettable composition is printed.

The jettable composition includes suspended nanoparticles. In some examples, the suspended nanoparticles may be ceramic nanoparticles, such as tungsten bronzes ($A_xWO_3$), indium tin oxide ($In_2O_3$:$SnO_2$, ITO), aluminum zinc oxide (AZO), ruthenium oxide ($RuO_2$), iron pyroxenes ($A_xFe_ySi_2O_6$ wherein A is Ca or Mg, x=1.5-1.9, and y=0.1-0.5), modified iron phosphates ($A_xFe_yPO_4$), and modified copper pyrophosphates ($A_xCu_yP_2O_7$). Tungsten bronzes may be alkali doped tungsten oxides. Examples of suitable alkali dopants (i.e., A in $A_xWO_3$) may be cesium, sodium, potassium, or rubidium. In an example, the alkali doped tungsten oxide may be doped in an amount ranging from greater than 0 mol % to about 0.33 mol % based on the total mol % of the alkali doped tungsten oxide. Suitable modified iron phosphates ($A_xFe_yPO_4$) may include copper iron phosphate (A=Cu, x=0.1-0.5, and y=0.5-0.9), magnesium iron phosphate (A=Mg, x=0.1-0.5, and y=0.5-0.9), and zinc iron phosphate (A=Zn, x=0.1-0.5, and y=0.5-0.9). For the modified iron phosphates, it is to be understood that the number of phosphates may change based on the charge balance with the cations. Suitable modified copper pyrophosphates ($A_xCu_yP_2O_7$) include iron copper pyrophosphate (A=Fe, x=0-2, and y=0-2), magnesium copper pyrophosphate (A=Mg, x=0-2, and y=0-2), and zinc copper pyrophosphate (A=Zn, x=0-2, and y=0-2). Other examples of ceramic nanoparticles include cadmium selenide (CdSe), cadmium telluride (CdTe), lead selenide (PbSe), cadmium sulfide (CdS), zinc sulfide (ZnS), zinc selenide (ZnSe), zinc oxide (ZnO), and/or silicon (Si). Any combinations of any of the ceramic nanoparticles may also be used.

In other examples, the suspended nanoparticles may be metal nanoparticles, such as silver (Ag), gold (Au), platinum (Pt), and other noble metals. Other examples of suitable metal nanoparticles include nanoparticles of rhenium (Re), iridium (Ir), ruthenium (Ru), and any metal that is resistant to chemical action and corrosion in an oxidizing environment (e.g., the aqueous vehicle of the jettable composition). The metal nanoparticles may also be an alloy of any of the listed metals.

The average particle size (e.g., volume-weighted mean diameter) of the suspended nanoparticles may range from about 2 nm to about 20 nm. In some examples, the average particle size of the suspended nanoparticles may range from about 2 nm to about 15 nm, or from about 2 nm to about 10 nm.

The suspended nanoparticles may be present in the jettable composition in an amount ranging from about 1 wt % to about 15 wt %. This weight percentage accounts for the weight percent of active nanoparticles present in the jettable composition, and does not account for the total weight percent of a suspension that includes the nanoparticles. In some of the examples disclosed herein, the nanoparticles may be in a suspension (e.g., nanoparticles in water), and the suspension may be added to the remaining components of the jettable composition. Even though water may be present in the nanoparticle suspension, the weight percentages given for the suspended nanoparticles represent the nanoparticles, and do not account for the other components (e.g., water) that may be present in the suspension.

In some examples, the suspended nanoparticles are self-dispersed. In other examples, the suspended nanoparticles may include organic capping agents, such as ethylenediamine tetraacetic acid (EDTA), oleylamine, poly(ethylene glycol) (PEG), poly(vinyl pyrrolidone) (PVP), poly(vinyl alcohol) (PVA), etc., to disperse them in a vehicle of the jettable composition.

In addition to the suspended nanoparticles, the jettable composition also includes the JC vehicle. As used herein, the term "JC vehicle" refers to the liquid fluid in which the suspended nanoparticles are placed to form the jettable composition(s). A wide variety of JC vehicles may be used with the jettable composition(s) of the present disclosure.

The JC vehicle may be aqueous, and thus may include water alone, or water in combination with a variety of additional components. Examples of these additional components may include zwitteionic stabilizer(s), co-solvent(s), surfactant(s), antimicrobial agent(s), anti-kogation agent(s), and/or chelating agent(s).

The JC vehicle of the jettable composition may include surfactant(s). Examples of suitable surfactants include any of the examples listed above in reference to the IPF vehicle. The surfactant may be present in an amount ranging from about 0.1 wt % to about 1 wt % (based on the total wt % of the jettable composition).

The JC vehicle may include co-solvent(s). Examples of the co-solvent include any of the examples listed above in reference to the IPF vehicle. The co-solvent may be present in an amount ranging from about 15 wt % to about 30 wt % (based on the total wt % of the jettable composition).

The JC vehicle of the jettable composition may also include zwitterionic stabilizer(s). The zwitterionic stabilizer may improve the stabilization of the jettable composition. The zwitterionic stabilizer molecules may form a protective layer around the suspended nanoparticles, and prevent them from coming into direct contact with each other and/or increase the distance between the particle surfaces (e.g., by a distance ranging from about 1 nm to about 2 nm). Thus, the zwitterionic stabilizer may prevent the suspended nanoparticles from agglomerating and/or settling in the suspension.

Examples of suitable zwitterionic stabilizers include C2 to C8 betaines, C2 to C8 aminocarboxylic acids having a solubility of at least 10 g in 100 g of water, taurine, and combinations thereof. Examples of the C2 to C8 aminocarboxylic acids include beta-alanine, gamma-aminobutyric acid, glycine, and combinations thereof.

The zwitterionic stabilizer may be present in the jettable composition in an amount ranging from about 1 wt % to about 10 wt % (based on the total wt % of the jettable composition).

In some examples, the JC vehicle may also include one or more of the previously mentioned additives. To reiterate, the additive may be an anti-kogation agent, a chelating agent, an antimicrobial agent, or a combination thereof. These additives may be any of the examples described above and may be included in the jettable composition in similar amounts to those described above in reference to the inkjet primer fluid.

The balance of the jettable composition is water. In an example, the water is deionized water.

In some examples, the jettable composition may also include a colorant in addition to the suspended nanoparticles. A colorant may be desirable when the jettable composition is an inkjet ink, or when the jettable composition is a fusing agent that will impart color to a 3D part. The amount of the colorant that may be present in the jettable composition ranges from about 1 wt % to about 10 wt % (based on the total wt % of the jettable composition). The colorant may be any of the pigments and/or dyes listed above in reference to the inkjet primer fluid.

In the method 100, the jettable composition may be an inkjet ink that is printed on a medium to form images, or it may be a fusing agent that is selectively applied to at least a portion of a build material. When used as a fusing agent, the method 100 may further include exposing the build material to electromagnetic radiation, thereby fusing the at least the portion of the build material in contact with the fusing agent to form a layer of a three-dimensional part.

When the jettable composition is thermal inkjet printed after the silicon dioxide film has been formed, the buildup of kogation over time within the thermal inkjet printhead may be reduced. The silicon dioxide film at least substantially prevents the suspended nanoparticles (e.g., ceramic, metal, etc.) from depositing on the resistor surface. Evidence of the reduction in kogation may be a reduction in a percent decrease in drop weight within a predetermined number of drops per nozzle and/or reduction in a percent decrease in drop velocity within a predetermined number of drops per nozzle (i.e., where the reduction(s) is/are when compared to percent decrease(s) that are observed using a thermal inkjet printhead that is untreated with the primer fluid disclosed herein).

Also disclosed herein is another method, which is shown at reference numeral 200 in FIG. 2. The method 200 shown in FIG. 2 includes combining suspended nanoparticles, an alkoxysilane, and a growth mediator to form a mixture (as shown at reference numeral 202); heating the mixture to a temperature ranging from about 60° C. to about 80° C. (as shown at reference numeral 204); stirring the mixture for a time period ranging from about 12 hours to about 36 hours, thereby forming silicon dioxide coated, suspended nanoparticles (as shown at reference numeral 206); and then, adding a surfactant, a zwitterionic stabilizer, a co-solvent, and a balance of water to the mixture to form a stabilized, jettable composition (as shown at reference numeral 208).

This method 200 may also reduce kogation during thermal inkjet printing. Similar to the method 100, kogation during thermal inkjet printing can be measured by a percent decrease in drop weight within a predetermined number of drops per nozzle, a percent decrease in drop velocity within a predetermined number of drops per nozzle, or a combination thereof. Additionally, this method 200 may improve the stabilization of a jettable composition. In an example, the stabilization of a jettable composition may be measured by its physical stability.

As mentioned above, the method 200 includes combining suspended nanoparticles, an alkoxysilane, and a growth mediator to form a mixture, as shown at reference numeral 202.

The suspended nanoparticles may be any of the suspended nanoparticles described above in reference to the jettable composition. The suspended nanoparticles used in the method 200 may also have the same or a similar particle size as the suspended nanoparticles described above in reference to the method 100. In an example, the suspended nanoparticles are metal oxide nanoparticles having a particle size ranging from about 2 nm to about 20 nm.

The suspended nanoparticles may be included in the mixture in an amount ranging from about 10 wt % to about 40 wt % based on the total wt % of the mixture. In an example, the suspended nanoparticles may be present in the mixture in an amount of about 20 wt % (based on the total wt % of the mixture). Again, it is to be understood that the weight percentages given for the suspended nanoparticles account for the weight percent of active nanoparticles present in the mixture, and does not account for any other components (e.g., water) that may be added with the nanoparticles (i.e., that are part of the nanoparticle suspension).

The alkoxysilane added to the mixture in the method 200 may be any of the alkoxysilanes described above in reference to the inkjet primer fluid. The alkoxysilane may be included in the mixture in an amount ranging from about 5 wt % to about 40 wt % based on the total wt % of the mixture. In an example, the alkoxysilane may be present in the mixture in an amount of about 10 wt % (based on the total wt % of the mixture). It is to be understood that the alkoxysilane concentration in the mixture may vary depending upon the weight loading and the surface-to-volume ratio of the suspended nanoparticles in the mixture.

The growth mediator may be included in the mixture to modify the condensation behavior of the alkoxysilane, and to improve the uniformity of the silicon dioxide coating that is formed on the nanoparticles. The growth mediator may also interact with the nanoparticles and may prevent the suspended nanoparticles from joining together and forming particles (or agglomerates of particles) with larger particle sizes. In an example, l-lysine may be the growth mediator. In other examples, other simple amino acids, such as glycine, alanine, and C4 to C8 end-terminated aminocarboxylic acids, may be used as the growth mediator. Other growth mediators having an electrostatic environment similar to l-lysine may also be used.

The amount of the growth mediator in the mixture may range from about 0.5 wt % to about 1 wt % based on the total wt % of the mixture. In an example, the growth mediator may be present in the mixture in an amount of about 0.75 wt % (based on the total wt % of the mixture).

In an example of the mixture, the alkoxysilane is selected from the group consisting of tetraethyl orthosilicate (TEOS), tetramethyl orthosilicate (TMOS), tetraisopropyl orthosilicate, tetrabutyl orthoslilicate, 3-aminopropyl triethoxysilane, and combinations thereof; and the growth mediator is l-lysine.

The balance of the mixture is water. As an example, deionized water may be used. Some of the water in the balance of the mixture may come from the nanoparticle suspension.

After the mixture is formed, the mixture is heated to a temperature ranging from about 60° C. to about 80° C., as shown at reference numeral 204 of FIG. 2. In an example, the mixture is heated to a temperature of about 70° C.

The mixture is also stirred for a time period ranging from about 12 hours to 36 hours, as shown at reference numeral 206 of FIG. 2. In an example, the mixture is stirred for a time period of about 24 hours.

In an example, the heating and the stirring of the mixture are accomplished at the same time. In another example, the stirring of the mixture is accomplished after the mixture is heated. In still another example, the mixture is maintained at the temperature to which it is heated (e.g., from about 60° C. to about 80° C.) for the duration of the stirring.

The heating and stirring of the mixture causes a silicon dioxide ($SiO_2$) coating to form on the suspended nanoparticles and thus forms silicon dioxide coated, suspended nanoparticles. The heating and stirring of the mixture may activate a series of reactions between the alkoxysilane in the mixture and the surfaces of the suspended nanoparticles. The alkoxysilane may undergo a hydrolysis reaction (similar to reaction (I) above) followed by a condensation reaction (similar to reaction (II) above) causing the formation of the silicon dioxide coating on the surface of the suspended nanoparticles.

The silicon dioxide coating formed on the suspended nanoparticles may have any thickness. In an example the thickness of the coating ranges from about 5 nm to about 20 nm. In an example, the silicon dioxide coating may have a non-uniform thickness (i.e., the thickness varies throughout the coating). The non-uniform thickness of the coating may range from about 5 nm to about 20 nm. In this example, the thickness throughout the plane of the silicon dioxide coating may vary but may always be between about 5 nm and about 20 nm. In another example, the silicon dioxide coating may have a uniform thickness ranging from about 5 nm to about 20 nm.

In some examples, the silicon dioxide coating is negatively charged. The silicon dioxide coating may be negatively charged when the coated nanoparticles are in the presence of a basic fluid (i.e., a fluid having a pH above 7), such as the fluid in the mixture or the jettable composition vehicle to which the mixture is added. In still another example, the silicon dioxide coating does not have a charge (i.e., is neutral). The silicon dioxide coating may have be neutral when the coated nanoparticles are in the presence of a neutral fluid (i.e., a fluid having a pH of 7), such as the fluid in the mixture or the jettable composition vehicle to which the mixture is added.

After forming the silicon dioxide coated, suspended nanoparticles, a surfactant, a zwitterionic stabilizer, a co-solvent, and a balance of water may be added to the mixture to form a stabilized, jettable composition, as shown at reference numeral 208 of FIG. 2. The surfactant, the zwitterionic stabilizer, and the co-solvent may be any of the surfactants, zwitterionic stabilizers, and co-solvents (respectively) described herein.

The stabilized, jettable composition may be the same as or similar to the jettable composition describe above in reference to the method 100, except that the stabilized, jettable composition formed via the method 200 includes the silicon dioxide coated, suspended nanoparticles. In contrast, the jettable composition used in the method 100 instead includes suspended nanoparticles without a silicon dioxide coating thereon.

The silicon dioxide coated, suspended nanoparticles may be present in the stabilized, jettable composition in an amount ranging from about 1 wt % to about 15 wt % (based on the total wt % of the stabilized, jettable composition). This weight percentage accounts for the weight percent of active silicon dioxide coated nanoparticles present in the stabilized, jettable composition, and does not account for other components of the mixture.

In an example, the silicon dioxide coated, suspended nanoparticles are present in the stabilized, jettable composition in an amount ranging from about 1 wt % to about 40 wt % based on a total wt % of the stabilized, jettable composition; the surfactant is present in the stabilized, jettable composition in an amount ranging from about 0.1 wt % to about 1 wt % based on the total wt % of the stabilized, jettable composition; the zwitterionic stabilizer is present in the stabilized, jettable composition in an amount ranging from about 1 wt % to about 10 wt % based on the total wt % of the stabilized, jettable composition; and the co-solvent is present in the stabilized, jettable composition in an amount ranging from about 15 wt % to about 30 wt % based on the total wt % of the stabilized, jettable composition.

In some examples, all or substantially all of the alkoxysilane and the growth mediator may form or become embedded in (respectively) the silicon dioxide coating. In other examples, a small amount (e.g., from about 0.1 to about 1 wt %) of the alkoxysilane and/or the growth mediator may remain in the stabilized, jettable composition.

While not shown in FIG. 2, it is to be understood that in some examples of the method 200, after the stabilized, jettable composition is formed, the stabilized, jettable composition may be thermal inkjet printed. When the stabilized, jettable composition is thermal inkjet printed, buildup of the silicon dioxide coated, suspended nanoparticles on the resistor of the thermal inkjet printhead may be reduced (i.e., kogation may be reduced). Kogation reduction may be observed by a percent decrease in drop weight within a predetermined number of drops per nozzle and/or a percent decrease in drop velocity within a predetermined number of drops per nozzle may be reduced (as compared to the percent decrease in drop weight within a predetermined number of drops per nozzle and/or the percent decrease in drop velocity within a predetermined number of drops per nozzle observed when thermal inkjet printing a similar jettable composition that has the same components in the same amounts as the stabilized, jettable composition but includes uncoated, suspended nanoparticles instead of the silicon dioxide coated, suspended nanoparticles).

The stabilized, jettable composition may also have improved physical stability (as compared to a similar jettable composition that has the same components in the same amounts as the stabilized, jettable composition but includes uncoated, suspended nanoparticles instead of the silicon dioxide coated, suspended nanoparticles).

Figure 3:
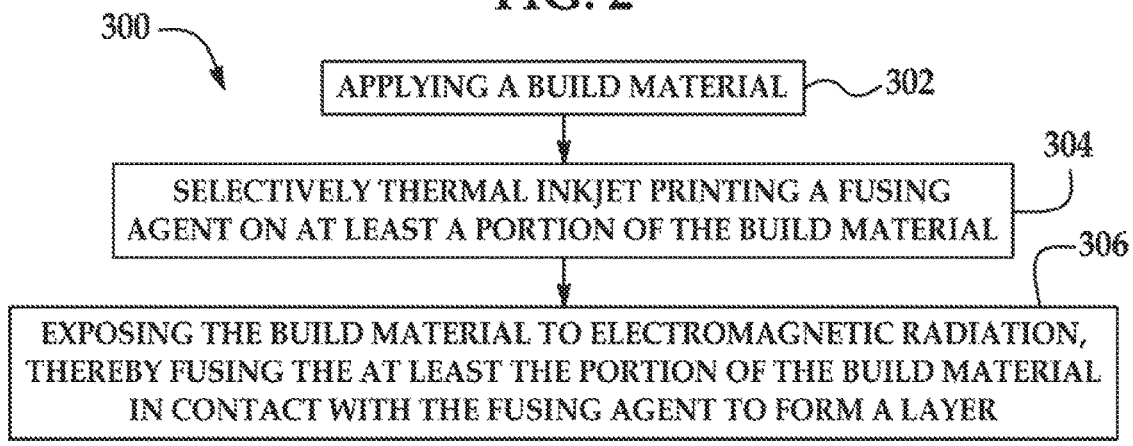
FIG. 3 is a flow diagram illustrating still another example of a method disclosed herein.

Also disclosed herein is still another method, which is shown at reference numeral 300 in FIG. 3. This method 300 may be used to print a 3D part. More particularly, the method 300 shown in FIG. 3 includes applying a build material (as shown at reference numeral 302); selectively thermal inkjet printing a fusing agent on at least a portion of the build material (as shown at reference numeral 304); and exposing the build material to electromagnetic radiation, thereby fusing the at least the portion of the build material in contact with the fusing agent to form a layer (as shown at reference numeral 306).

As mentioned above, the method 300 includes applying a build material, as shown at reference numeral 302. The build material may be a powder, a liquid, a paste, or a gel.

In an example, the build material may be a polymeric material or may be a composite material of polymer and ceramic. Examples of polymeric build material include semi-crystalline thermoplastic materials with a wide processing window of greater than 5° C. (i.e., the temperature range between the melting point and the re-crystallization temperature. Some specific examples of the polymeric build material include polyamides (PAs) (e.g., PA 11/nylon 11, PA 12/nylon 12, PA 6/nylon 6, PA 8/nylon 8, PA 9/nylon 9, PA 66/nylon 66, PA 612/nylon 612, PA 812/nylon 812, PA 912/nylon 912, etc.). Other specific examples of the polymeric build material include polyethylene, polyethylene terephthalate (PET), and an amorphous variation of these materials. Still other examples of suitable polymeric build materials include polystyrene, polyacetals, polypropylene, polycarbonate, polyester, thermal polyurethanes, other engineering plastics, and blends of any two or more of the polymers listed herein. Core shell polymer particles of these materials may also be used.

Any of the previously listed polymeric build materials may be combined with ceramic particles to form the composite build material. Examples of suitable ceramic particles include metal oxides, inorganic glasses, carbides, nitrides, and borides. Some specific examples include alumina ($Al_2O_3$), glass, silicon mononitride (SiN), silicon dioxide ($SiO_2$), zirconia ($ZrO_2$), titanium dioxide ($TiO_2$), or combinations thereof.

The amount of ceramic particles that may be combined with the polymeric build material may depend on the polymeric build material used, the ceramic particles used, and the 3D part to be formed. In one example, the ceramic particles may be present in an amount ranging from about 1 wt % to about 20 wt % based on the total wt % of the build material.

In another example, the build material may be a wax, such as paraffin wax.

In still another example, the build material may be a metal or a metal alloy. Some examples of the metallic build material include steels, stainless steel, titanium (Ti) and alloys thereof, aluminum (Al) and alloys thereof, nickel (Ni) and alloys thereof, cobalt (Co) and alloys thereof, iron (Fe) and alloys thereof, nickel cobalt (NiCo) alloys, gold (Au) and alloys thereof, silver (Ag) and alloys thereof, platinum (Pt) and alloys thereof, and copper (Cu) and alloys thereof. Some specific examples include AlSi10Mg, 2xxx series aluminum, 4xxx series aluminum, CoCr MP1, CoCr SP2, MaragingSteel MS1, Hastelloy C, Hastelloy X, NickelAlloy HX, Inconel IN625, Inconel IN718, SS GP1, SS 17-4PH, SS 316L, Ti6Al4V, and Ti-6Al-4V ELI7. While several example alloys have been provided, it is to be understood that other alloy build materials may be used.

The build material may have a melting point ranging from about 50° C. to about 3500° C. As examples, the build material may be a polyamide having a melting point of 180° C., or thermal polyurethanes having a melting point ranging from about 100° C. to about 165° C.

The build material 12 may be made up of similarly sized particles or differently sized particles. The term "size" as used herein with regard to the build material, refers to the diameter of a spherical particle, or the average diameter of a non-spherical particle (i.e., the average of multiple diameters across the particle). In an example, the average size of the particles of the build material ranges from 5 µm to about 100 µm.

When the build material is the polymeric or polymeric composite build material, it may include, in addition to polymer or composite particles, a charging agent, a flow aid, or combinations thereof. Charging agent(s) may be added to suppress tribo-charging. Examples of suitable charging agent(s) include aliphatic amines (which may be ethoxylated), aliphatic amides, quaternary ammonium salts (e.g., behentrimonium chloride or cocamidopropyl betaine), esters of phosphoric acid, polyethylene glycolesters, or polyols. Some suitable commercially available charging agents include HOSTASTAT® FA 38 (natural based ethoxylated alkylamine), HOSTASTAT® FE2 (fatty acid ester), and HOSTASTAT® HS 1 (alkane sulfonate), each of which is available from Clariant Int. Ltd.). In an example, the charging agent is added in an amount ranging from greater than 0 wt % to less than 5 wt % based upon the total wt % of the build material.

Flow aid(s) may be added to improve the coating flowability of the polymeric or polymeric composite build material. Flow aid(s) may be particularly beneficial when the particles of the build material are less than 25 µm in size. The flow aid improves the flowability of the build material by reducing the friction, the lateral drag, and the tribocharge buildup (by increasing the particle conductivity). Examples of suitable flow aids include tricalcium phosphate (E341), powdered cellulose (E460(ii)), magnesium stearate (E470b), sodium bicarbonate (E500), sodium ferrocyanide (E535), potassium ferrocyanide (E536), calcium ferrocyanide (E538), bone phosphate (E542), sodium silicate (E550), silicon dioxide (E551), calcium silicate (E552), magnesium trisilicate (E553a), talcum powder (E553b), sodium aluminosilicate (E554), potassium aluminum silicate (E555), calcium aluminosilicate (E556), bentonite (E558), aluminum silicate (E559), stearic acid (E570), or polydimethylsiloxane (E900). In an example, the flow aid is added in an amount ranging from greater than 0 wt % to less than 5 wt % based upon the total wt % of the build material.

The build material may be applied in a layer relatively uniform in thickness. In an example, the thickness of the layer is about 100 µm. In another example, the thickness of the layer ranges from about 50 µm to about 300 µm, although thinner or thicker layers may also be used. For example, the thickness of the layer may range from about 20 μm to about 500 μm, or from about 30 μm to about 300 μm. In some examples, the layer thickness may be about 1.2× (i.e., 1.2 times) or about 2× the particle diameter at a minimum for finer part definition.

In some examples of the method 300, prior to further processing, the layer of the build material particles may be exposed to heating. Heating may be performed to pre-heat the build material particles, and thus the heating temperature may be below the melting point or softening point of the build material particles. As such, the temperature selected will depend upon the build material particles that are used. As examples, the pre-heating temperature may be from about 5° C. to about 50° C. below the melting point or softening point of the build material particles. In an example, the pre-heating temperature ranges from about 50° C. to about 250° C. In another example, the pre-heating temperature ranges from about 150° C. to about 170° C. In still another example, the pre-heating temperature ranges from about 150° C. to about 400° C.

After the build material is applied, and in some instances is pre-heated, a fusing agent is selectively thermal inkjet printed on at least a portion of the build material, as shown at reference numeral 304.

In some examples, the fusing agent may be the jettable composition describe above in reference to the method 100. As mentioned above, the jettable composition includes suspended nanoparticles without a silicon dioxide coating thereon.

In other examples, the fusing agent may be the stabilized, jettable composition describe above in reference to the method 200. As mentioned above, the stabilized, jettable composition includes the silicon dioxide coated, suspended nanoparticles. It is to be understood that when the stabilized, jettable composition is used as the fusing agent, the silicon dioxide coating on the nanoparticles is not thick enough to significantly affect the ability of the suspended nanoparticles to absorb electromagnetic radiation.

It is to be understood that when the jettable composition or the stabilized, jettable composition is used as the fusing agent, the uncoated, suspended nanoparticles or the silicon dioxide coated, suspended nanoparticles (respectively) are capable of absorbing enough electromagnetic radiation to cause the portion(s) of the build material, on which the jettable composition or the stabilized, jettable composition was thermal inkjet printed, to cure (e.g., sinter, bind, fuse, etc.).

It is to be understood that a single fusing agent may be selectively thermal inkjet printed on at least the portion, or multiple fusing agents may be selectively thermal inkjet printed on the at least the portion of the build material. As an example, multiple fusing agents may be used when a colorant is included in at least one of the multiple fusing agents to create a multi-colored part.

After the fusing agent is selectively thermal inkjet printed on the at least the portion of the build material, the entire layer of the build material (including the fusing agent thermal inkjet printed on at least a portion thereof) is exposed to electromagnetic radiation. This is shown at reference numeral 306 of FIG. 3.

The electromagnetic radiation may be emitted from a radiation source, such as an infrared (IR) or near-IR curing lamp, IR or near-IR light emitting diodes (LED), a magnetron that emits microwaves, or lasers with the desirable electromagnetic wavelengths. As an example, the radiation source is a near-infrared light source with wavelengths ranging from about 800 nm to about 2 μm.

The length of time the electromagnetic radiation is applied for, or energy exposure time, may be dependent, for example, on one or more of: characteristics of the radiation source; characteristics of the build material; and/or characteristics of the fusing agent.

The fusing agent enhances the absorption of the electromagnetic radiation, converts the absorbed radiation to thermal energy, and promotes the transfer of the thermal heat to the build material in contact therewith. In an example, the fusing agent sufficiently elevates the temperature of the build material above the melting point(s), allowing curing (e.g., sintering, binding, fusing, etc.) of the build material particles in contact with the fusing agent to take place. In an example, the temperature is elevated about 50° C. above the melting temperature of the build material. The fusing agent may also cause, for example, heating of the build material, below its melting point but to a temperature suitable to cause softening and bonding. It is to be understood that portions of the build material that do not have the fusing agent thermal inkjet printed thereon do not absorb enough energy to fuse. Exposure to electromagnetic radiation forms a 3D layer or part, as shown at reference numeral 306 in FIG. 3.

It is to be understood that the 3D part may include several layers. Each additional layer of the 3D part may be formed by repeating reference numerals 302-306. For example, to form an additional layer of the 3D part, an additional layer of the build material may be applied to the layer shown in reference numeral 306 and the additional layer may be preheated, may have the fusing agent selectively thermal inkjet printed thereon, and may be exposed to electromagnetic radiation to form that additional layer. Any number of additional layers may be formed.

In some examples, the method 300 may be performed after or as part of the method 100. In these examples, the primer fluid may be thermal inkjet printed prior to the thermal inkjet printing of the fusing agent (i.e., jettable composition). The primer fluid may be used to treat the thermal inkjet printhead that will be used in the 3D printing method 300 before the fusing agent is selectively applied/printed with the printhead. The treatment with the primer fluid will coat the resistor(s) of the printhead with the silicon dioxide film, and thus will reduce kogation of the subsequently printed fusing agent on the resistor(s).

In some other examples, the method 300 may be performed after the method 200. In these examples, after the stabilized, jettable composition is formed according to the method 200, it may be used as the fusing agent in the method 300.

To further illustrate the present disclosure, examples are given herein. It is to be understood that these examples are provided for illustrative purposes and are not to be construed as limiting the scope of the present disclosure.

EXAMPLES

Example 1

An example of the inkjet primer fluid disclosed herein was prepared. The alkoxysilane used was tetraethyl orthosilicate (TEOS). The general formulation of the example inkjet primer fluid is shown in Table 1, with the wt % of each component that was used.

TABLE 1

| Ingredient | Specific component | Example inkjet primer fluid (wt %) |
|---|---|---|
| Co-solvent | 2-pyrrolidone | 19 |
| | Triethylene glycol | 8 |
| Surfactant | TEGO ®WET 510 | 0.75 |
| Anti-kogation agent | CRODAFOS ™ O3A | 0.75 |
| Chelating agent | TRILON ® M | 0.45 |
| Antimicrobial agent | ACTICIDE ® B20 | 0.07 |
| | ACTICIDE ® M20 | 0.18 |
| Alkoxysilane | Tetraethyl orthosilicate | 1 |
| Water | | Balance |

The vehicle including the co-solvents, the surfactant, the anti-kogation agent, the chelating agent, the antimicrobial agent, and the water was prepared first, and tetraethyl orthosilicate was added last.

The example inkjet primer fluid was filled into a HP 761 printhead, and the HP 761 printhead was installed in a HP OfficeJet testbed. Ink supplies, which were connected to the HP 761 printhead via tubing, were filled with an example of the jettable composition. The suspended nanoparticles included in the example jettable composition were cesium tungsten oxide nanoparticles. The general formulation of the example jettable composition is shown in Table 2, with the wt % of each component that was used. The weight percentage of the suspended nanoparticles represents the total nanoparticle solids in the final formulation.

TABLE 2

| Ingredient | Specific component | Example jettable composition (wt %) |
|---|---|---|
| Co-solvent | 1-(2-hydroxyethyl)-2-pyrrolidone | 25 |
| Surfactant | TERGITOL ™ 15S30 | 0.2 |
| Zwitterionic stabilizer | Betaine | 1 |
| Suspended nanoparticles | Cesium tungsten oxide nanoparticles | 8 |
| Water | | Balance |

The example inkjet primer fluid was thermal inkjet printed from the HP 761 printhead until it was depleted (approximately 30 mL per printhead was printed). The HP 761 printhead was refilled from the ink supplies with the example jettable composition, and the example jettable composition was thermal inkjet printed.

The example jettable composition was also thermal inkjet printed from an untreated HP 761 printhead, which had not first been exposed to the example inkjet primer fluid.

Figure 4:
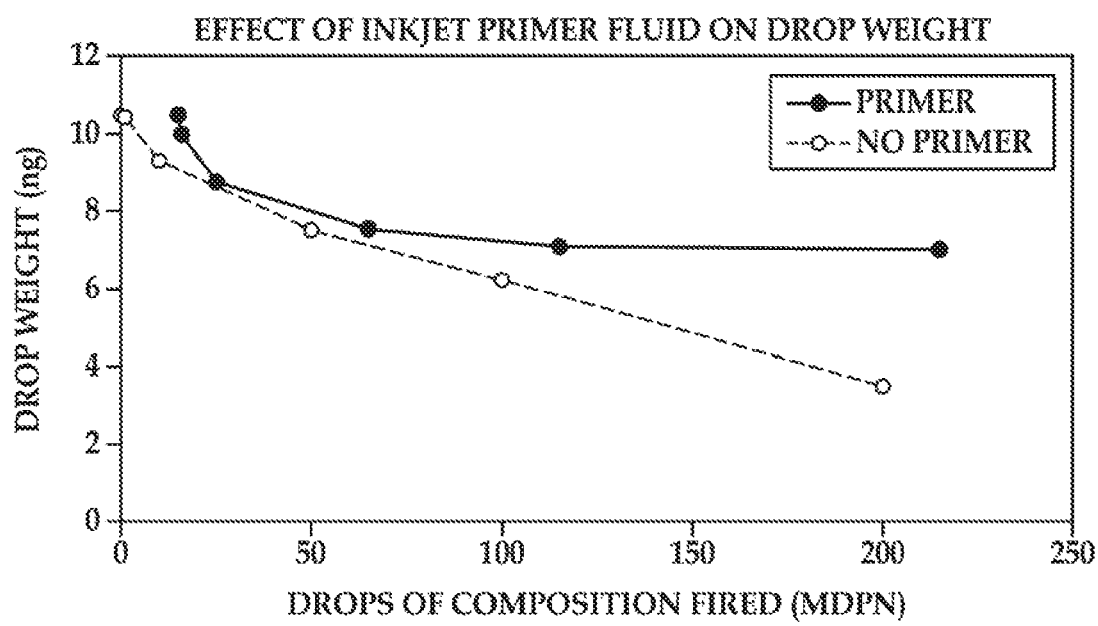
FIG. 4 is a graph illustrating the effect of an example inkjet primer fluid on drop weight (ng, Y axis) over drops of composition fired (million drops per nozzle (MDPN), X axis)

The drop weight for the HP 761 printhead that was treated with the inkjet primer fluid and the drop weight for the untreated HP 761 printhead were measured over drops of the example jettable composition fired. The results of the drop weight measurements are shown in FIG. 4. The drop weight values (in ng) are along the Y axis, and the X axis indicates the amount of jettable composition printed (in million drops per nozzle (MDPN)). The results for the HP 761 printhead that was treated with the inkjet primer fluid are labeled "Primer," and the results of the untreated HP 761 printhead are labeled "No Primer." As shown in FIG. 4, the decrease in drop weight was less for the HP 761 printhead that was treated with the inkjet primer fluid than for the untreated HP 761 printhead. As also shown in FIG. 4, the drop weight decrease of the HP 761 printhead that was treated with the inkjet primer fluid appears to have leveled off after about 50 MDPN.

Figure 5:
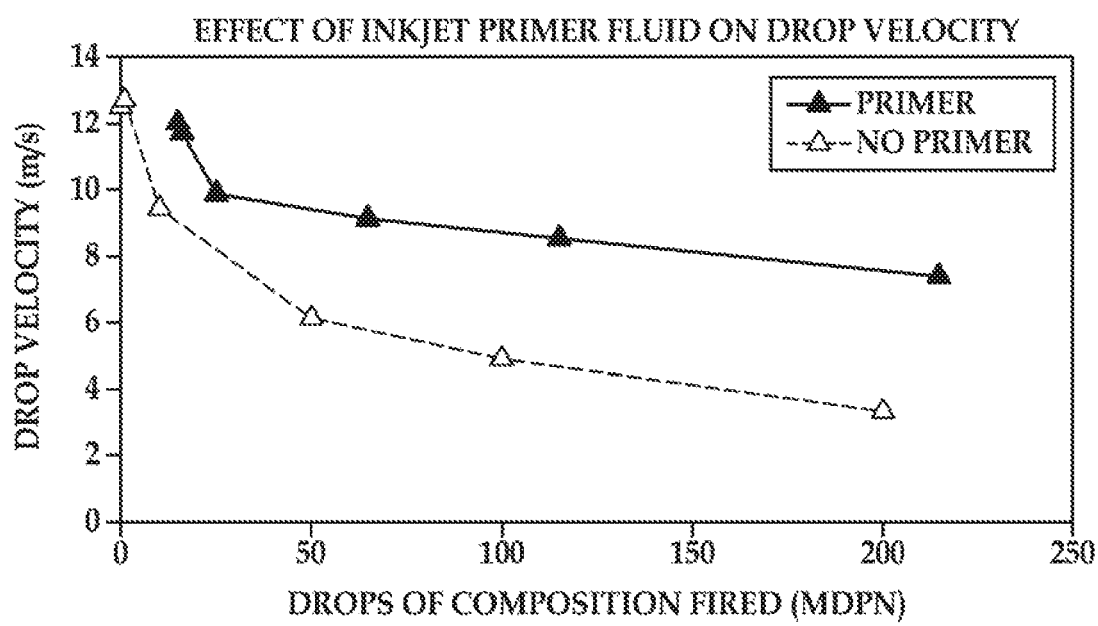
FIG. 5 is a graph illustrating the effect of an example inkjet primer fluid on drop velocity (m/s, Y axis) over drops of composition fired (million drops per nozzle (MDPN). X axis)

The drop velocity for the HP 761 printhead that was treated with the inkjet primer fluid and the drop velocity for the untreated HP 761 printhead were also measured over drops of the example jettable composition fired. The results of the drop velocity weight measurements are shown in FIG. 5. The drop velocity values (in m/s) are along the Y axis, and the X axis indicates the amount of jettable composition printed (in MDPN). The results for the HP 761 printhead that was treated with the inkjet primer fluid are labeled "Primer," and the results of the untreated HP 761 printhead are labeled "No Primer." As shown in FIG. 5, the decrease in drop velocity was less for the HP 761 printhead that was treated with the inkjet primer fluid than for the untreated HP 761 printhead.

Figure 6:
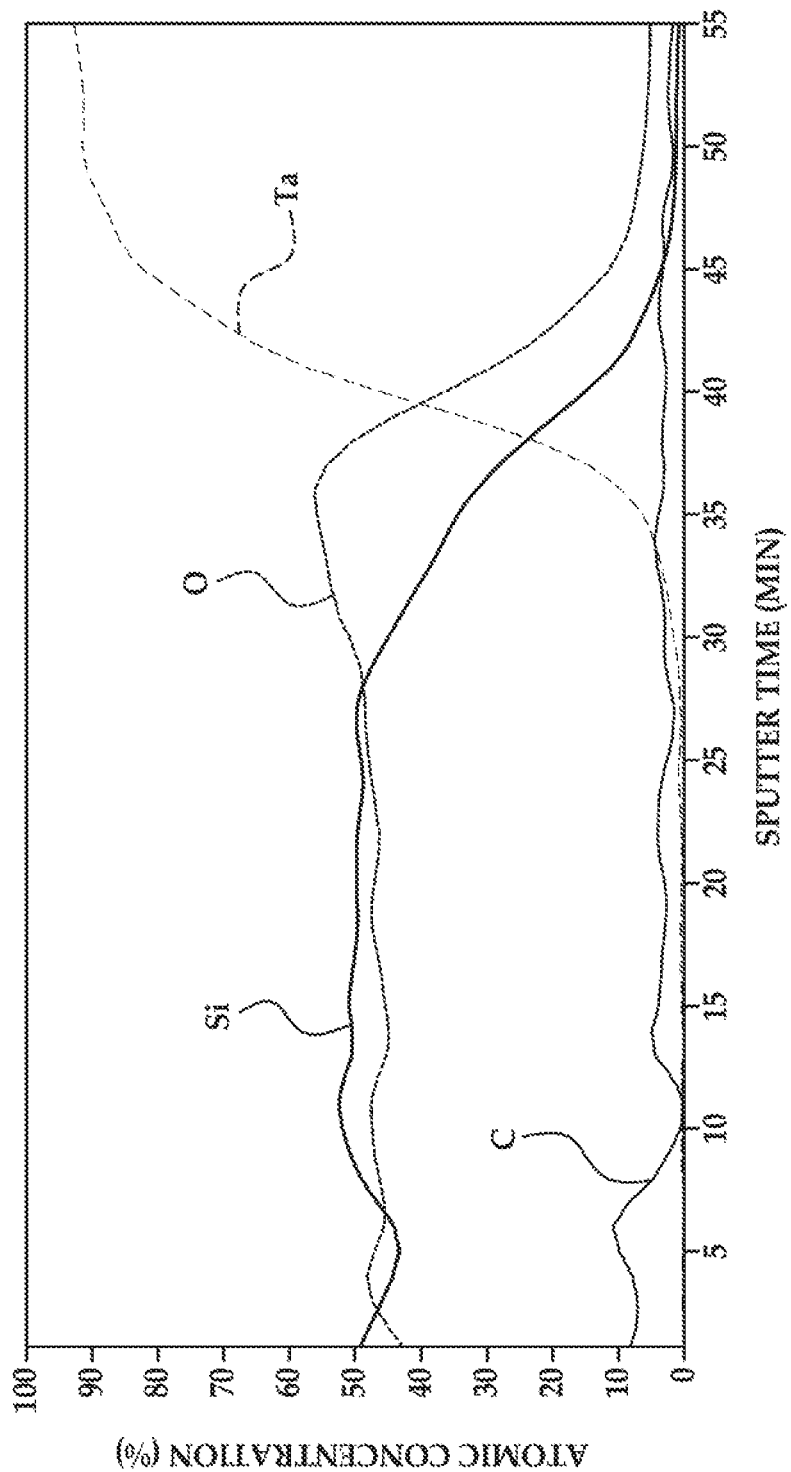
FIG. 6 is a graph illustrating the results of a depth-sputtering experiment in atomic concentration values (%, measured by Auger electron spectroscopy (AES), Y axis) versus the sputter time (minutes, X axis).

Printing the inkjet primer fluid via the thermal inkjet printhead formed a silicon dioxide film on the surface of the resistor of the HP 761 printhead. The silicon dioxide film was measured by Auger electron spectroscopy (AES) in a depth-sputtering experiment. The results of the depth-sputtering experiment (for silicon, oxygen, carbon, and tantalum) are shown in FIG. 6. The atomic concentration values (in %, measured by AES) are along the Y axis, and the X axis indicates the sputter time (in minutes). The etch rate was about 10 nm/minute. From the depth-sputtering experiment, the thickness of the silicon dioxide film was determined to be about 356 nm.

Example 2

An example of the stabilized, jettable composition disclosed herein was prepared. Cesium tungsten oxide nanoparticles were used as the suspended nanoparticles. Tetraethyl orthosilicate (TEOS) was used as the alkoxysilane, and l-lysine was used as the growth mediator.

The cesium tungsten oxide nanoparticles were combined with tetraethyl orthosilicate and l-lysine to form a mixture. The mixture was heat to about 70° C. and stirred for about 24 hours to form a silicon dioxide coating on the cesium tungsten oxide nanoparticles. Then, a surfactant, a zwitterionic stabilizer, a co-solvent, and a balance of water were added to the mixture to form the example stabilized, jettable composition. The general formulation of the example stabilized, jettable composition is shown in Table 3, with the wt % of each component that was used. The weight percentage of the silicon dioxide coated, suspended nanoparticles represents the total nanoparticle solids in the final formulation.

TABLE 3

| Ingredient | Specific component | Example stabilized, jettable composition (wt %) |
|---|---|---|
| Co-solvent | 1-(2-hydroxyethyl)-2-pyrrolidone | 25 |
| Surfactant | TERGITOL ™ 15S30 | 0.2 |
| Zwitterionic stabilizer | Betaine | 1 |
| Silicon dioxide coated, suspended nanoparticles | Silicon dioxide coated cesium tungsten oxide nanoparticles | 8 |
| Water | | Balance |

The example stabilized, jettable composition (of Example 2) and the example jettable composition from Example 1 were each stored in an AS environment at a temperature of 60° C. The particle size for the example jettable composition was measured after preparation, after 1 week, and after 2 weeks in the AS environment. The particle size for the example stabilized, jettable composition was measured after preparation, after 1 week, after 2 weeks, and after 4 weeks in the AS environment.

In this Example, several particle size measurements were made, including: volume-weighted mean diameter (MV, in μm), 50% (D50, 50% of the particles below this size) in μm, 95% (D95, 95% of the particles are below this size) in μm, total # of particles/mL≥0.5 μm, and total # of particles/mL 1 μm. The volume-weighted mean diameter (MV) was measured with a NANOTRAC® WAVE particle size analyzer (available from MICROTRAC™—NIKKISO GROUP™). The test samples were prepared by diluting jettable composition samples [1:5000] with deionized water and analyzing the samples without further treatment. The D50 (i.e., the median of the particle size distribution, where % the population is above this value and % is below this value) and the D95 (i.e., 95% the population is below this value) were also determined using the particle size analyzer. The particle size was measured using an ACCUSIZER A 2000 (from PSS), which counts particles and determines the number of particles of a particular size that are present in 1 mL of the sample.

The results of the particle size measurements for the example jettable composition (from Example 1, including uncoated nanoparticles) are shown in Table 4, and the results of the particle size measurements for the example stabilized, jettable composition (including coated nanoparticles) are shown in Table 5.

TABLE 4

| Particle size | After preparation | After 1 week AS | After 2 weeks AS |
|---|---|---|---|
| MV in μm | 0.0065 | 0.0086 | 0.0093 |
| 50% in μm | 0.0052 | 0.0067 | 0.0071 |
| 95% in μm | 0.0013 | 0.0176 | 0.0195 |
| Total # of particles/mL ≥ 0.5 μm | 9,930,000 | 10,600,000 | 10,700,000 |
| Total # of particles/mL ≥ 1 μm | 208,000 | 287,000 | 373,000 |

TABLE 5

| Particle size | After preparation | After 1 week AS | After 2 weeks AS | After 4 weeks AS |
|---|---|---|---|---|
| MV in μm | 0.00434 | 0.00434 | 0.00435 | 0.00467 |
| 50% in μm | 0.00357 | 0.00352 | 0.00352 | 0.00383 |
| 95% in μm | 0.00857 | 0.00889 | 0.00896 | 0.00937 |

Tables 4 and 5 show that the example stabilized, jettable composition, which contained silicon dioxide coated cesium tungsten oxide nanoparticles, was more stable than the example jettable composition, which contained uncoated cesium tungsten oxide nanoparticles. Further, after week 2, the uncoated cesium tungsten oxide nanoparticles in the example jettable composition settled and were no longer suspended.

It is to be understood that the ranges provided herein include the stated range and any value or sub-range within the stated range. For example, a range from about 1 wt % to about 10 wt % should be interpreted to include not only the explicitly recited limits of from about 1 wt % to about 10 wt %, but also to include individual values, such as 3.35 wt %, 5.5 wt %, 7.75 wt %, 9 wt %, etc., and sub-ranges, such as from about 2 wt % to about 6.5 wt %, from about 2.5 wt % to about 8.7 wt %, etc. Furthermore, when "about" is utilized to describe a value, this is meant to encompass minor variations (up to +/−10%) from the stated value.

Reference throughout the specification to "one example", "another example", "an example", and so forth, means that a particular element (e.g., feature, structure, and/or characteristic) described in connection with the example is included in at least one example described herein, and may or may not be present in other examples. In addition, it is to be understood that the described elements for any example may be combined in any suitable manner in the various examples unless the context clearly dictates otherwise.

In describing and claiming the examples disclosed herein, the singular forms "a", "an", and "the" include plural referents unless the context clearly dictates otherwise.

While several examples have been described in detail, it is to be understood that the disclosed examples may be modified. Therefore, the foregoing description is to be considered non-limiting.

What is claimed is:

1. An inkjet primer fluid, comprising:
   an alkoxysilane;
   a surfactant;
   a co-solvent;
   a stabilizing alcohol;
   an additive selected from the group consisting of an anti-kogation agent, a chelating agent, an antimicrobial agent, and a combination thereof; and
   a balance of water;
   wherein any of:
      the alkoxysilane is present in an amount ranging from about 0.1 wt % to about 2 wt % based on a total wt % of the inkjet primer fluid;
      the surfactant is present in an amount ranging from about 0.01 wt % to about 2 wt % based on the total wt % of the inkjet primer fluid;
      the co-solvent is present in an amount ranging from about 15 wt % to about 98 wt % based on the total wt % of the inkjet primer fluid;
      the stabilizing alcohol is present in an amount ranging from about 1 wt % to about 70 wt % based on the total wt % of the inkjet primer fluid; and
      the additive is present in an amount ranging from about 0.1 wt % to about 2 wt % based on the total wt % of the inkjet primer fluid;
   and wherein the inkjet primer fluid is at least substantially colorless.

2. The inkjet primer fluid as defined in claim 1 wherein the alkoxysilane is selected from the group consisting of tetraethyl orthosilicate (TEOS), tetramethyl orthosilicate (TMOS), tetraisopropyl orthosilicate, tetrabutyl orthoslilicate, 3-aminopropyl triethoxysilane, and combinations thereof.

3. The inkjet primer fluid as defined in claim 1 wherein the inkjet primer fluid excludes a colorant and a dispersant.

4. The inkjet primer fluid as defined in claim 1 wherein the inkjet primer fluid:
   includes a pigment in an amount ranging from about to 0.002 wt % about 0.01 wt % based a total wt % of the inkjet primer fluid; and
   excludes a dispersant.

5. A method, comprising:
   thermal inkjet printing a primer fluid including an alkoxysilane, a surfactant, a co-solvent, and a balance of water from a thermal inkjet printhead, thereby forming a silicon dioxide film on a resistor of the thermal inkjet printhead; and then thermal inkjet printing a jettable composition from the thermal inkjet printhead, the jettable composition including suspended nanoparticles;

wherein the jettable composition is a fusing agent that is selectively applied to at least a portion of a build material, and wherein the method further comprises exposing the build material to electromagnetic radiation, thereby fusing the at least the portion of the build material in contact with the fusing agent to form a layer of a three-dimensional part.

6. The method as defined in claim 5 wherein the silicon dioxide film has:
pores with a pore size ranging from about 50 nm to about 1000 nm; and
a non-uniform thickness.

7. The method as defined in claim 5 wherein the silicon dioxide film has a thickness ranging from about 5 nm to about 500 nm.

8. The method as defined in claim 5 wherein the alkoxysilane is selected from the group consisting of tetraethyl orthosilicate (TEOS), tetramethyl orthosilicate (TMOS), tetraisopropyl orthosilicate, tetrabutyl orthoslilicate, 3-aminopropyl triethoxysilane, and combinations thereof.

9. A method, comprising:
combining suspended nanoparticles, an alkoxysilane, and a growth mediator to form a mixture;
heating the mixture to a temperature ranging from about 60° C. to about 80° C.;
stirring the mixture for a time period ranging from about 12 hours to about 36 hours, thereby forming silicon dioxide coated, suspended nanoparticles; and
then, adding a surfactant, a zwitterionic stabilizer, a co-solvent, and a balance of water to the mixture to form a stabilized, jettable composition.

10. The method as defined in claim 9 wherein:
the silicon dioxide coated, suspended nanoparticles are present in the stabilized, jettable composition in an amount ranging from about 1 wt % to about 40 wt % based on a total wt % of the stabilized, jettable composition;
the surfactant is present in the stabilized, jettable composition in an amount ranging from about 0.1 wt % to about 1 wt % based on the total wt % of the stabilized, jettable composition;
the zwitterionic stabilizer is present in the stabilized, jettable composition in an amount ranging from about 1 wt % to about 10 wt % based on the total wt % of the stabilized, jettable composition; and
the co-solvent is present in the stabilized, jettable composition in an amount ranging from about 15 wt % to about 30 wt % based on the total wt % of the stabilized, jettable composition.

11. The method as defined in claim 9 wherein:
the alkoxysilane is selected from the group consisting of tetraethyl orthosilicate (TEOS), tetramethyl orthosilicate (TMOS), tetraisopropyl orthosilicate, tetrabutyl orthoslilicate, 3-aminopropyl triethoxysilane, and combinations thereof; and
the growth mediator is I-lysine.

12. The method as defined in claim 9 wherein the suspended nanoparticles are metal oxide nanoparticles having a particle size ranging from about 2 nm to about 20 nm.

* * * * *